United States Patent
Grover et al.

(10) Patent No.: US 9,460,143 B2
(45) Date of Patent: Oct. 4, 2016

(54) METHODS, SYSTEMS, AND COMPUTER READABLE MEDIA FOR A MULTI-VIEW DATA CONSTRUCT FOR LOCK-FREE OPERATIONS AND DIRECT ACCESS

(71) Applicant: Oracle International Corporation, Redwood Shores, CA (US)

(72) Inventors: Lalit Grover, Haryana (IN); Syed Mohsin Reza Zaidi, Cary, NC (US)

(73) Assignee: Oracle International Corporation, Redwood Shores, CA (US)

( * ) Notice: Subject to any disclaimer, the term of this patent is extended or adjusted under 35 U.S.C. 154(b) by 212 days.

(21) Appl. No.: 14/181,603

(22) Filed: Feb. 14, 2014

(65) Prior Publication Data

US 2015/0234933 A1     Aug. 20, 2015

(51) Int. Cl.
*G06F 17/30* (2006.01)

(52) U.S. Cl.
CPC ... *G06F 17/30359* (2013.01); *G06F 17/30949* (2013.01)

(58) Field of Classification Search
None
See application file for complete search history.

(56) References Cited

U.S. PATENT DOCUMENTS

| 2005/0071335 A1* | 3/2005 | Kadatch | G06F 17/30949 |
| 2005/0198030 A1* | 9/2005 | McKenney | G06F 17/30359 |
| 2009/0077135 A1* | 3/2009 | Yalamanchi | G06F 17/30359 |

OTHER PUBLICATIONS

Sutter, "Writing a Generalized Concurrent Queue," http://www.drdobbs.com/parallel/writing-a-generalized-concurrent-queue/211601363, pp. 1-4 (Oct. 29, 2008).
Gidenstam et al., "Efficient and Reliable Lock-Free Memory Reclamation Based on Reference Counting," http://www.cse.chalmers.se/~tsigas/papers/LFMemRec-TPDS.pdf, IEEE Transactions on Parallel and Distributed Systems, pp. 1-14 (Sep. 5, 2008).
Sundell et al., "Lock-free deques and doubly linked lists," Journal of Parallel and Distributed Computing, http://www.cse.chalmers.se/~tsigas/papers/Lock-Free-Deques-Doubly-Lists-JPDC.pdf, vol. 68, pp. 1008-1020 (2008).
Harris, "A Pragmatic Implementation of Non-Blocking Linked-Lists," http://www.cl.cam.ac.uk/research/srg/netos/papers/2001-caslists.pdf, pp. 1-15 (Sep. 11, 2001).

* cited by examiner

*Primary Examiner* — Anh Tai Tran
(74) *Attorney, Agent, or Firm* — Jenkins, Wilson, Taylor & Hunt, P.A.

(57) ABSTRACT

Methods, systems, and computer readable media for a multi-view data construct that supports lock-free operations and direct access are disclosed. According to one aspect, a system includes a multi-view data construct including a persistent collection of elements, each element being associated with a unique identifier. Each element includes at least one pointer for configuring the element as a member of a linked list that contains as members elements of the multi-view data construct, data that indicates access status, and a data area within the collection itself or a pointer to a statically or dynamically allocated data area outside of the collection. A control module can identify elements in the collection by each element's respective identifier and can traverse elements in the collection using the pointers contained in each element. Concurrent access to an element by multiple entities is mediated using that element's access status and without using locks or locking operations.

20 Claims, 13 Drawing Sheets

Multi-View data construct III

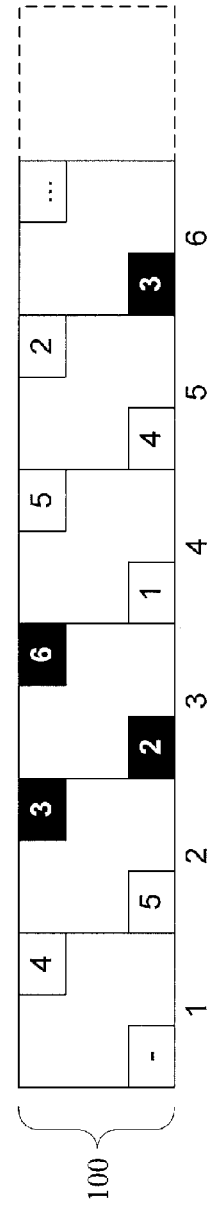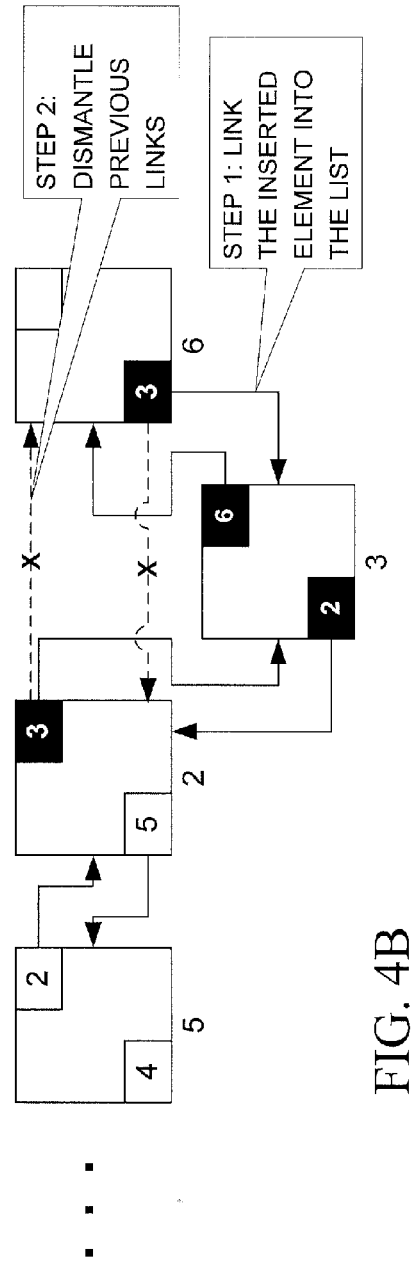
FIG. 4A
FIG. 4B

DELETE I

DELETE II
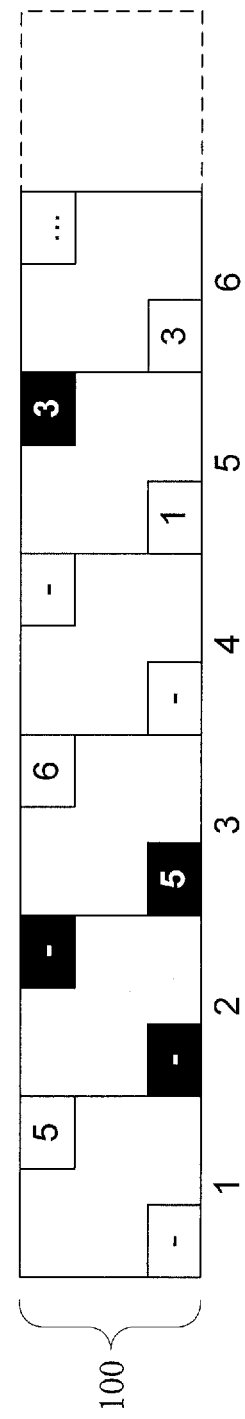
FIG. 6A Array View
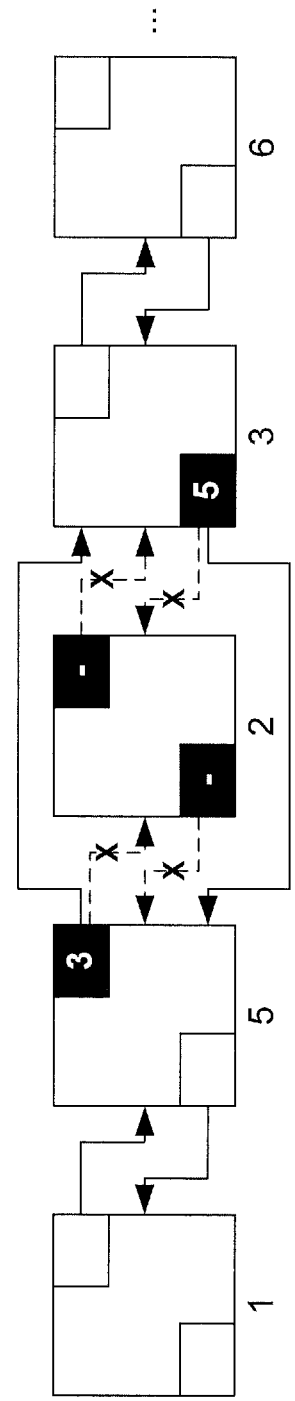
FIG. 6B Linked List View

METHODS, SYSTEMS, AND COMPUTER READABLE MEDIA FOR A MULTI-VIEW DATA CONSTRUCT FOR LOCK-FREE OPERATIONS AND DIRECT ACCESS

TECHNICAL FIELD

The subject matter described herein relates to methods, systems, and computer readable media for a multi-view data construct that supports lock-free linked-list manipulation and access (both sequential and direct) and the use of same to implement transactional protocols (including timed-transaction protocols) or database solutions in performance critical systems.

BACKGROUND

Telecommunication protocols often use transactions that involve the exchange of messages between two entities, such as a query sent from a client node A to a server node B followed by a response sent from node B back to node A, or a command sent from A to B followed by an acknowledgement of that command sent from B to A. As used herein, the term "transaction" broadly refers to an interaction between two entities, which may be, but are not limited to, two nodes in a network, two networks, two hardware modules within a frame, two software applications within a node, two modules within an application, and so on.

In an example scenario, node A will usually include in the first message some unique identifier that will also appear in the response, which node A can then use to correlate responses with their respective requests. This requires node A to maintain a repository of transaction records associated with these unique identifiers. When sending a query, node A will insert a record into the transaction repository. Upon receipt of a response message, node A will usually need to search this repository to see which query, if any, the message is a response to, and then subsequently process the response message and purge the corresponding record. In addition, transactional protocols often need the ability to sequentially traverse transaction records in some pre-determined order (e.g. transaction expiration time).

Thus, it is desirable to keep the list of unique identifiers in a data structure that supports insertion, deletion, traversal, modification, and searching. Both arrays and linked lists are well suited for sequential traversal of their elements, but each has advantages and disadvantages.

An array, for example, can be indexed so that it can be searched quickly, which makes arrays well suited for direct access. Inserting an element into an array or deleting an element from an array, however, are expensive operations because they require adjacent elements to be relocated to make space for the inserted element or to close up the space left behind by a deleted element.

Doubly-linked lists, on the other hand, are well suited for insertion and deletion. They are not indexed, however, and thus searching a linked list involves stepping through the list element by element until the desired element is found, which can take more time as the linked list increases in length. Where linked lists are used, the elements to be added to a linked list are typically allocated on an as-needed basis, i.e., dynamically. Each member of a linked list typically includes pointers to other members.

Thus, what is needed is a data structure that can support both "array-like" operations such as indexing and searching and "list-like" operations such as insertion, deletion, and reordering. Such a data structure is referred to as a "multi-view" data construct, since it would allow data to be indexed as if it were contained within array but also support insert, delete, and reorder operations as if it were a linked list. The above operations also have applicability to database solutions that require multiple views into the database schema.

In some applications, such as telecommunications applications and database solutions, for example, it may be possible that the elements of a data structure may be operated upon by multiple entities simultaneously. Thus, the data construct must be capable of being used concurrently while maintaining data integrity.

A common approach to supporting concurrent access is to use locks so that only one entity at a time may change the data contained within the data structure. Lock-based synchronization commonly uses a data construct called a mutual-exclusion flag, or "mutex", to indicate whether a data structure is currently in use or available. Locks have disadvantages, however. In one approach, the entire data structure is locked when an entity is manipulating any element in the structure, which is easy to implement but which can stall operations by other entities, even when the other entity wants to manipulate a different element than the one being currently manipulated. Another approach is to lock only the element being manipulated, which is less likely to stall other entities but which is inefficient and complicated to implement, especially for insertion and deletion in a linked list, as these operations typically involve the modification of more than one linked list element. This approach also relies on system-level locks: when multiple threads attempt to use the same mutex, the operating system kernel must arbitrate between the threads. This kernel-level arbitration is computationally expensive and can become a system bottleneck during periods of peak activity. Thus, what is needed is a multi-view data construct that supports concurrent access in a lock-free manner.

Yet another issue that a multi-view construct that supports concurrent access must address is management of the lifecycle of an element, defined herein as the time from when an element is allocated to the time that the element is released. Since each member of a linked list can be pointed to by other members, before a dynamically allocated member of a linked list can be released, the system must ensure that nothing is pointing to that member. This is of particular concern in a multithreaded system or other application where a member may be accessed or otherwise processed by more than one entity, sometimes simultaneously or near-simultaneously. Thus, multi-view constructs that support linked lists must address the two-fold problem of keeping track of an element's presence in a list (managing list membership) and also mediating attempts by multiple entities to access the same element (managing access.)

One conventional technique for managing these twin problems, which stores in each member a number that indicates how many other members are pointing to or accessing that member, is unworkable for dynamically allocated linked lists. In this technique, which is called "reference counting", an element in a linked list can be released only if its reference count=0 (signifying that no other element links to that member and that the element is not currently being accessed by any entity.) Once the element is released, however, the reference count disappears along with the element. To overcome that problem, another approach was developed that stores information outside of the members themselves, using data constructs called "hazard pointers", which are a list of pointers to elements that are in use. When an element is no longer being accessed its entry is removed from the hazard pointer list. This requires the maintenance of one or more lists to hold the hazard pointers. Thus, what is needed is a lock-free multi-view construct that is compatible with methods for managing element lifecycles.

Thus, in light of the disadvantages associated with conventional implementations of multi-view data constructs, there exists a need for an alternative approach to implement multi-view data constructs that support "lock-free" operations (e.g., operations that do not use mutexes) and direct access.

SUMMARY

According to one aspect, the subject matter described herein includes a system for using a multi-view data construct for lock-free operations and direct access. The system includes a multi-view data construct including a persistent collection of elements, each element being associated with a unique identifier and including at least one pointer for configuring the element as a member of a linked list that contains as members elements of the multi-view data construct. As used herein, the term "persistent" refers to an entity, such as statically or dynamically allocated memory, that persists for the entire duration for which the multi-view data construct will be in use. Each element also includes a data area or a pointer to a dynamically or statically allocated data area. The system includes a control module comprising hardware and that can identify elements in the collection by each element's respective identifier, can traverse elements in the collection using values in the at least one pointer contained in each element, and can perform lock-free operations.

According to another aspect, the subject matter described herein includes a method for using a multi-view data construct for lock-free operations and direct access. The method includes, at a node having hardware, detecting a trigger condition, and, in response to detecting the trigger condition, identifying an element in a multi-view data construct comprising a persistent collection of elements, each element being associated with a unique identifier and including at least one pointer for configuring the element as a member of a linked list that contains as members elements of the multi-view data construct, each element also including a data area, a pointer to a dynamically allocated data area, or a pointer to a statically allocated data area, and performing a lock-free operation on the identified element.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIGS. 4A and 4B illustrate an exemplary linked-list INSERT operation using a multi-view data construct according to an embodiment of the subject matter described herein;

FIGS. 6A and 6B illustrate an array DELETE operation using a multi-view data construct according to an embodiment of the subject matter described herein;

DETAILED DESCRIPTION

In accordance with the subject matter disclosed herein, systems, methods, and computer readable media for a multi-view data construct that supports lock-free operations and direct access are provided. The multi-view data constructs described herein allow the lock-free management of doubly-linked lists of memory elements using, for example, reference counting. Version checking and an "access status" flag allow coordination between multiple threads without using mutexes.

Reference will now be made in detail to exemplary embodiments of the present invention, examples of which are illustrated in the accompanying drawings. Wherever possible, the same reference numbers will be used throughout the drawings to refer to the same or like parts.

Figure 1A:
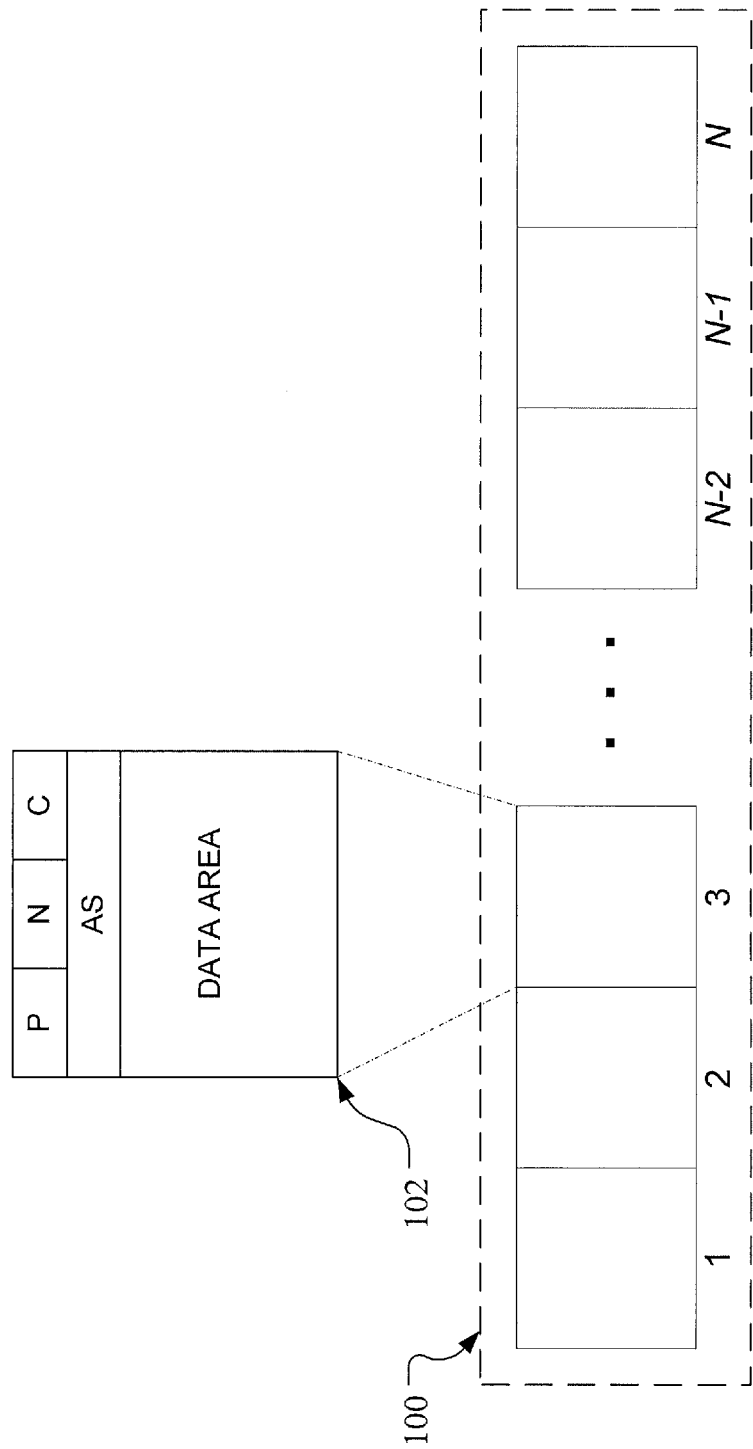
FIGS. 1A, 1B, and 1C illustrate exemplary multi-view data constructs for lock-free operations and direct access according to embodiments of the subject matter described herein.
Figure 1B:
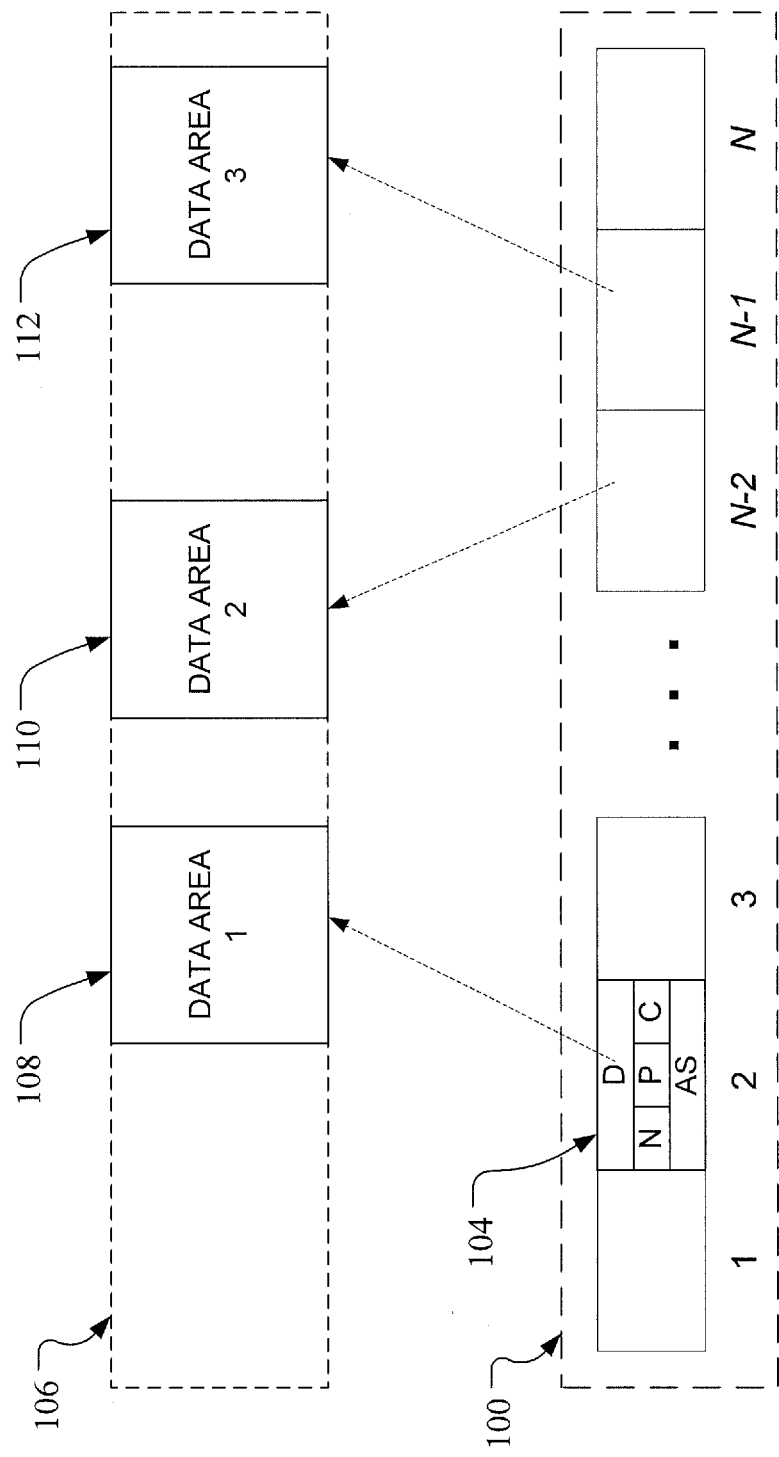
Figure 1C:
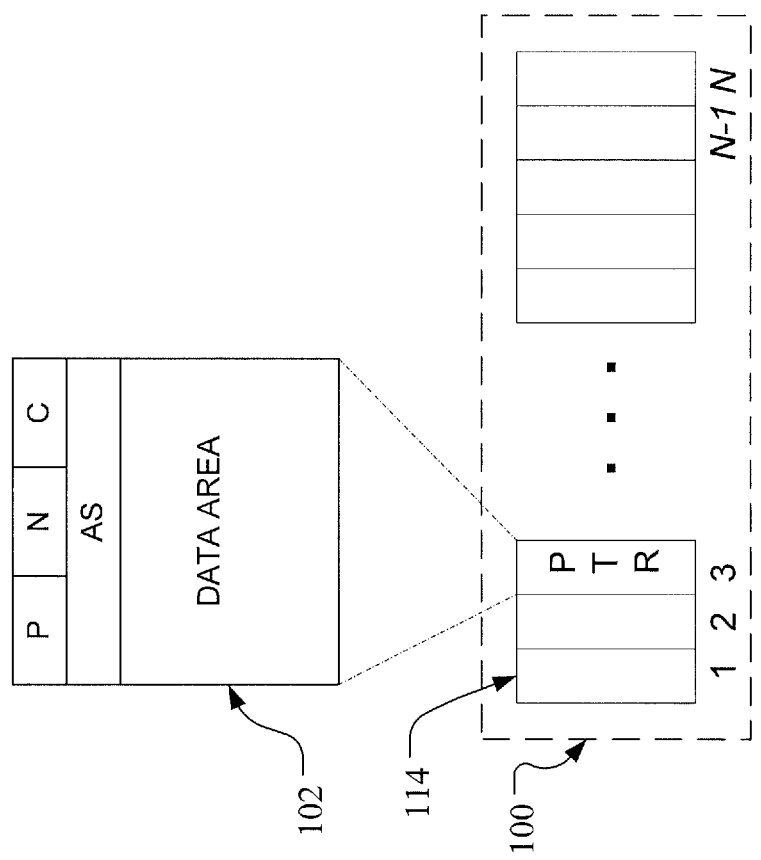

FIGS. 1A, 1B, and 1C illustrate exemplary multi-view data constructs for lock-free operations and direct access according to embodiments of the subject matter described herein. In one embodiment, lock-free synchronization makes use of "atomic" operations, which are defined as a set of one or more operations that are guaranteed to either all succeed or all fail.

In the embodiment illustrated in FIG. 1A, multi-view data construct 100 is a persistent collection of elements 102, each element 102 including a pointer N for pointing to a next element, a pointer P for pointing to a previous element, and a data area. Because elements 102 are elements within a collection, they may be identified by a unique identifier. In one embodiment, such as illustrated in FIG. 1A, the persistent collection of elements may be a statically or dynamically allocated array of contiguous memory, but other persistent collections of elements may also be used, and these may occupy contiguous or non-contiguous memory. For simplicity of illustration, the concepts presented herein are described using a statically allocated array, but this is intended to be illustrative and not limiting. The same principles may be applied to any persistent collection of elements.

In the embodiment illustrated in FIG. 1A, the left-most element 102 is at location 1 in the array, and the right-most element 102 is at location N in the array. (By convention used herein, array elements are numbered starting from 1.) Thus, elements 102 within data construct 100 are indexed. Because element 102 contains pointers N and P, they may be organized into a doubly or singly linked list, with each pointer N containing the array index of the next element in the linked list, and each pointer P containing the array index of the previous element in the linked list. In one embodiment, multi-view data construct 100 occupies contiguous memory, which enables algorithmic calculation of a physical memory address based on an index number.

In the embodiment illustrated in FIG. 1A, each element 102 stores data that indicates access status AS, which is used to implement concurrent access to the element by multiple entities without using locks or locking operations. This will be described in more detail in Table 1, below. The access status data is used to provide lock-free coordination between multiple entities. As will be described below, in one embodiment, the access status data enables lock-free coordination between producers of data and consumers of that data.

In one embodiment, data for managing the life-cycle of an element may be stored within that element, obviating the need for hazard pointers. In the embodiment illustrated in FIG. 1A, for example, each element 102 includes a reference count field C, which is used to maintain a count of how many other elements point to that particular element and of how many entities are currently accessing the element. In one embodiment, for example, the value of C within an element may be incremented every time a forward or backward link is made to that element, and decremented every time an existing link to or from that element is dismantled. Thus, for an element that is part of a linked list, its C will have a value of 2 or more. In addition, the value of C may be incremented by an entity when that entity begins to access or otherwise process the element, and decremented by that entity when it has finished accessing or processing that element. Thus, when an element that is part of a linked list is being accessed by a thread, for example, the value of C for that element will be at least 3. If the thread is modifying the linked list in some manner, the value of C for that element may be 4 or more. In this manner, the single field C can serve the dual purpose of managing list membership and managing access. In one embodiment, an element may be safely released if C=0, and that element may be assumed to be in use by a thread or other entity if its C is greater than 2. Thus, a single field C can perform functions of both hazard pointers and reference counting logic, obviating the need for hazard pointers. In an alternative embodiment, each element 102 may not include a reference count, e.g., hazard pointers may be used instead. In yet another alternative embodiment, each element 102 may include a reference count that is used in combination with hazard pointers to manage list membership and access, respectively.

In another embodiment, construct 100 is a statically allocated array of pointers to elements, where the elements themselves may be statically or dynamically allocated. In the embodiment illustrated in FIG. 1B, each element 104 of construct 100 includes N and P pointers as described above for element 102, but instead of containing a data area within the element itself, each element 104 includes a pointer D which points to a data area outside of the statically allocated array 100, e.g., within available memory area 106. For example, in FIG. 1B, the second element of construct 100 includes a pointer to a first data area 108, the N–$2^{nd}$ element points to a second data area 110, and the N–$1^{st}$ element points to a third data area 112. Data areas 108, 110, and 112 may be statically allocated or they may be dynamically allocated and released. For reasons explained in more detail below, elements 102 in FIG. 1A and elements 104 in FIG. 1B are persistent (i.e., their memory is not freed.)

FIG. 1C illustrates yet another embodiment of a multi-view data constructs for lock-free operations and direct access. In the embodiment illustrated in FIG. 1C, construct 100 includes a statically allocated array of pointers to dynamically allocated elements 102. The dynamically allocated elements 102 may contain access status AS, pointers N and P, and a data area (or a pointer to a data area.) In this embodiment, each element may be identified by the index of its pointer in the statically allocated array.

By using persistent elements, such as elements 102 in FIG. 1A, elements 104 in FIG. 1B, or elements 114 in FIG. 1C, hazard pointers are not needed (although they can still be used for management of the life-cycle of an element, for example, as will be described below.) In the embodiment illustrated in FIG. 1A, for example, the array elements 102 and 104 are statically allocated and not released. Since elements 102 and 104 are not released, a reference-counting mechanism can be used. In addition, since the data areas pointed to by elements 104 may be dynamically allocated, data construct 100 as shown in FIG. 1B also has the advantages of dynamic memory allocation for the data areas. Because data construct 100 is persistent and contiguous, not only can it be used to store the reference count in the array itself, but elements within the array can be addressed by array indexing as well. Because each element contains N and P pointers, the elements of data construct 100 can be organized into a linked list. Thus, the embodiments of data construct 100 shown in FIGS. 1A and 1B support both "array-like" operations such as indexing and searching and "list-like" operations such as insertion, deletion, and reordering using reference-counting and without the need for hazard pointers.

In one embodiment, the life-cycle of each of the elements 102 (FIGS. 1A and 1C) or 104 (FIG. 1B) of the array 100 (i.e. from the time it is acquired from the array till the time it is released back to the array) is managed by a reference count C that is contained within the element, along with the use of hazard pointers. This involves maintaining references to the memory addresses of elements (called hazard pointers) that are currently being accessed. C may be incremented every time an element is referred to by a different list element (through its N or P pointers) and decremented when the latter no longer refers to the former. Hazard pointers may be added every time an element is accessed by an entity while it is processing the list (e.g. deleting an adjacent node, traversing through the list, etc) and removed once the element is no longer being accessed by that entity. Once no references to an element remain (i.e. C=0, and no hazard pointers remain), that element is eligible for being released back to the array.

In one embodiment, the lifecycle of each of the elements 102 (FIGS. 1A and 1C) or 104 (FIG. 1B) of the array 100 is managed by a reference count C that is contained within the element. As described above, this reference count may be incremented every time an element is (a) referred to by a different list node, or (b) accessed by an entity while it is processing the list. It may be decremented once the element is (a) no longer referred to by any list node, or (b) no longer being accessed by an entity for processing. Once no references to an element remain, it is eligible for being released back to the array.

Figure 2:
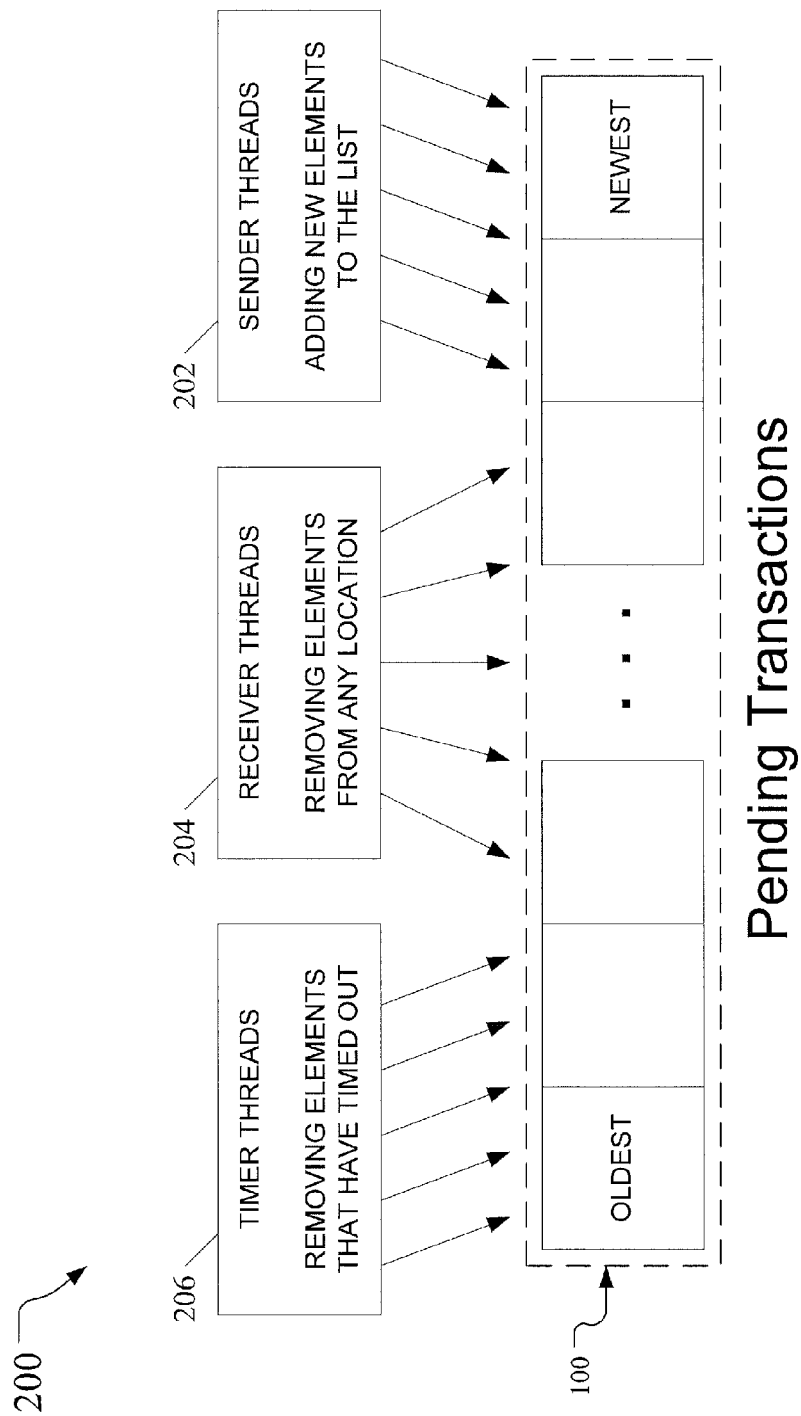
FIG. 2 is a block diagram illustrating an exemplary application of a multi-view data construct in a telecommunications network according to an embodiment of the subject matter described herein.

FIG. 2 is a block diagram illustrating an exemplary application of multi-view data construct 100 in a telecommunications network according to an embodiment of the subject matter described herein. In the embodiment illustrated in FIG. 2, system 200 uses construct 100 to store information about pending telecommunications transactions in a "list of pending transactions", referred to as simply "list 100". For example, a telecommunications node that includes the elements of system 200 may issue a query message to another node, such as a database node, for example, and expect a reply message from that other node. At the time that the query is sent, a new element 102 may be inserted as an entry into list 100. The newly added entry may include information about the transaction, and may include information that uniquely identifies the transaction. As reply messages are received, list 100 may be searched to see if the message is a reply to a previously sent query. If a matching entry is found, the response may be processed according to information stored within the found entry. If the query/response transaction is complete, the entry corresponding to the completed transaction may be removed from list 100 and the element 102 may be marked as available for reuse.

Thus, in this scenario, system 200 may include sender threads 202 that generate query messages and add corresponding entries (e.g., one entry per query message sent) to one end of list 100 and receiver threads 204 that receive response messages, find the corresponding entry within list 100, and remove the found entry from the list. In one embodiment, when a sender thread 202 needs to add an entry to the list, it may determine or be provided with the index of the first available (e.g., not yet used) entry in list 100. In one embodiment, sender thread 202 may include the index number of the entry as a field in the query message; if that field is included in the response message, the receiver thread 204 may use that index to go directly to the correct entry within list 100 without having to traverse the list 100 element by element looking for a match.

For timed queries, e.g., queries that must receive a response within a time limit or else the transaction is canceled, system 200 may also include timer threads 206 that remove elements that correspond to queries that have timed out. In one embodiment, the elements in the list of pending transactions may include an expiration date/time and may be connected into a linked list ordered by expiration date/time. This allows timer threads 206 to traverse the list from oldest to newest, deleting entries whose expiration date/time is older than the current date/time, and stopping as soon as the timer thread finds an entry that has not expired yet. Because the linked list is ordered by expiration date, as soon as an unexpired entry is found, timer threads 206 can stop searching.

Thus, in the example illustrated in FIG. 2, sender threads 202 and timer threads 206 may use list-like operations, such as insert and traversal/delete, respectively, while receiver threads 204 may use both array-like operations, such as search and index, and list-like operations, such as delete.

Figure 3A:
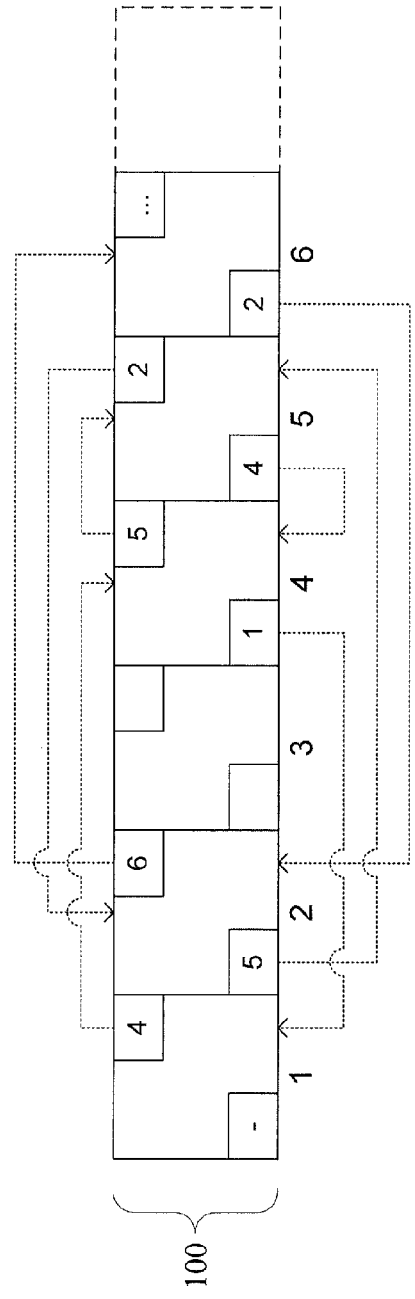
FIGS. 3A and 3B illustrate an example use of multi-view construct 100 according to an embodiment of the subject matter described herein, illustrating its support of both array-like and list-like operations.
Figure 3B:
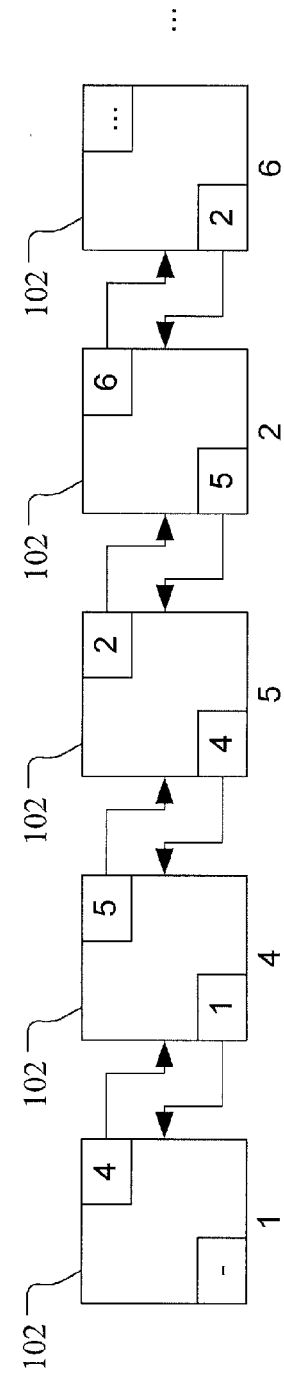

FIGS. 3A and 3B illustrate an example use of multi-view construct 100 according to an embodiment of the subject matter described herein, to show how it supports both array-like operations and list-like operations. The same construct 100 is shown in FIGS. 3A and 3B.

FIG. 3A illustrates an array view of multi-view data construct 100 according to an embodiment of the subject matter described herein. FIG. 3A shows that construct 100 is an array of elements. The array index value of each element is shown in bold font at the center of the element. In the example illustrated in FIG. 3A, array element 1 is also the first element in the linked list, but this is not mandatory; any element within construct 100 may be the first element in the linked list. Pointer N within element 1 points to the next element in the linked list, element 4. Note that the next element in the linked list created by pointers N and P is not necessarily the next element in the array. Pointer P within element 1 points to the previous element in the list, but since element 1 is the first element, pointer P within element 1 is empty or contains a NULL value.

Looking now at element 4, the N pointer in element 4 points to the next element in the list, element 5, while the P pointer in element 4 points to the previous element in the list, element 1. Continuing down the linked list, the N pointer in element 5 points to the next element in the list, element 2, while the P pointer in element 5 points to the previous element in the list, element 5. In this manner, the linked list is constructed from elements that may be located at any array index within construct 100.

In the example illustrated in FIG. 3A, element 3 of the array is unused, i.e., it is not included within the linked list created by pointers N and P. This means that element 3 of the construct 100 is available for use by a sender thread 202 in FIG. 2, for example. Element 3 may have previously been a part of the linked list, but was removed from the linked list when construct 100 is used in a system such as the one illustrated in FIG. 2, for example, by a receiver thread 204 because the transaction was completed, or by a timer thread 206 because the transaction represented by element 3 had timed out. All of these operations will be described in more detail below.

FIG. 3B illustrates a linked list view of the same data construct 100 shown in FIG. 3A according to an embodiment of the subject matter described herein. In FIG. 3B, the array elements are visually arranged in the order that they appear in the linked list created by the N and P pointer values. When construct 100 is used in a system such as the one illustrated in FIG. 2, for example, a timer thread 206 may traverse the list from left to right, looking for elements that correspond to requests that have timed out and delete them from the list. In the embodiment illustrated in FIG. 3A, construct 100 may have array elements beyond element 6. Likewise, the linked list made up of elements from construct 100 and illustrated in FIG. 3B may include members beyond element 6.

In the examples described herein, the left-most element, e.g., element 1, is used as a "sentinel" node, e.g., one that is used solely for the purpose of indicating the beginning of the linked list, and is never removed from the list. Likewise, another node may be reserved for use as a sentinel node used solely to indicate the end of the linked list. In one embodiment, for example, the sentinel node indicating the end of the linked list may have a NULL value in its N pointer. Other embodiments that do not use sentinel nodes are also within the scope of the subject matter described herein, however. FIGS. 4A and 4B illustrate an exemplary linked-list INSERT operation using a multi-view data construct according to an embodiment of the subject matter described herein. FIG. 4A shows the operation from the array view and FIG. 4B shows the same operation from the linked list view. This operation may be performed by a sender thread 202 in FIG. 2, for example, such as when a new request message is being issued and information associated with that request is stored in an element that is added to the end of the list. In one embodiment, if the request is a timed request, the sender thread may calculate the expiration time of the request and store that information within the element. FIGS. 4A and 4B illustrate a change that is made to the data construct 100 shown in FIGS. 3A and 3B. FIGS. 3A and 3B show the contents of data construct 100 before the change and FIGS. 4A and 4B show the contents of data construct 100 after the change. By convention used herein, pointer values that were changed by the operation are shown as black boxes with white font, while pointer values that were not changed by the operation are shown as white boxes with black font.

First, an available element must be found. In one embodiment, the array may be traversed from one end to the other, e.g., using array indexing, until an element whose N and P values are set to a null is found. In another embodiment, unused and available elements may be organized into a separate linked list from which elements may be taken. For example, when an element is needed, the element at the head of the list may be taken. In yet another embodiment, unused and available elements may be organized into a separate array-based free-list from which elements may be taken. For example, when an element is needed, it may be taken from the head array index of the free-list. Alternatively, the elements may be taken from the tail of the linked list or array rather than from the head.

In the example embodiment illustrated in FIGS. 4A and 4B, it has been determined that element 3 is the array is available for use. In one embodiment, sender thread 202 may include the array index for that element in the message that it sends out in such a manner that the array index will be included in the response message that is received.

In FIG. 4A, element 3 is inserted between elements 2 and 6 by manipulation of N and P values. First, element 3 is inserted into the linked list between elements 2 and 6. In the embodiment illustrated in FIG. 4A, this is accomplished by setting the N value of element 3 to the N value of the element it is being inserted in front of, which means that the N value of element 3 is set to the N value of element 2, i.e., "6". The P value of element 3 is set to the P value of the element it is being inserted behind, which means that the P value of element 3 is set to the P value of element 6, i.e., "2". Next, the previous links between elements 2 and 6 are dismantled and the respective pointers are changed to point to element 3. For example, the N value of element 2 is changed from "6" to "3", and the P value of element 6 is changed from "2" to "3". This is shown graphically in FIG. 4B, which shows that the links that connected elements 2 and 6 are dismantled and now point to element 3. In this manner, any element in the array may be inserted anywhere into the linked list.

By performing the above operations atomically in this order, an INSERT may be performed in a lock-free manner, by using the following technique: after element 3 is inserted into the linked list but before the previous links are dismantled, the elements on either side of the inserted element should still be pointing to each other. In the embodiment illustrated in FIGS. 4A and 4B, for example, N of element 2 should still be pointing to element 6, and P of element 6 should still be pointing to element 2.

If, however, some other operation has occurred involving elements 2 or 6, elements 2 and 6 would no longer point to each other. For example, if element 2 had been deleted by a timer thread 206 because it timed out, element 6 may now be pointing to element 5. Likewise, if element 6 had been deleted by a receiver thread 204 because a response had been received and processed, element 2 may now be pointing to the element that element 6 had been pointing to. Thus, after element 3 has been stitched into the linked list, the pointer values of elements 2 and 6 are checked to make sure that they are still pointing to each other. If so, their pointer values are changed so that they now point to inserted element 3 and the INSERT operation is completed. If elements 2 and 6 for some reason do not still point to each other, the INSERT operation may be aborted and retried, i.e., element 3 will be inserted between a different pair of elements. This technique obviates the need for locks and thus does not suffer the performance penalties associated with locks.

TABLE 1

| F | V | ID | T |
|---|---|---|---|
| 1 = processed<br>0 = pending | Version<br>(monotonically increasing value) | Index | Expiration<br>Time |

Table 1, above, illustrates information that may be stored in each element 102 of multi-view data construct 100. In one embodiment, access status data, which is used to mediate concurrent access between multiple entities without the use of locks or locking operation, may include an access flag "F" and version information "V". "F" and "V" together indicate access status of the element. An example will now be described with reference to system 200.

In one embodiment, when an element that represents a query or other type of transaction for which a reply is expected, for example, is added to a linked list (by a sender thread 202, for example), F may be set to a value of "0", which indicates that the element is waiting for a reply or "pending", e.g., the element has not yet been accessed by a receiver thread 204 or timer thread 206. Later, if either a receiver thread or timer thread access the element, the thread will first check the access status flag F; if the access status is still "pending", the thread sets the access status to a value of "1" to indicate that the element is "processed", i.e., that the element is being processed or has been processed. Once the element has been processed, it may be removed from the linked list and made available for reuse. In one embodiment, the value of the access status flag may remain "1" until the element is reused.

Thus, if a second thread attempts to access the same element during or after the first thread's access (and before the element has been removed from the list), the second thread will be allowed to access that element, because the element is not locked by the first thread. The second thread can determine by the value of the access flag, however, that this element is either being processed or has already been processed, and the second thread may therefore abandon its access attempt or otherwise take no action. In this manner, F may be used to mediate access between multiple entities, even when they have attempted to access an element simultaneously, without the use of locks or locking operations.

Although the terms "pending" and "processed" are used in this example, other representative terms may be used to describe the access status, such as "available" and "unavailable", "not in use" and "in use", etc. Regardless of the terminology used, the concept is that access by one thread or other entity does not prevent access by another thread or entity, i.e., there is no "lock" operation.

Version "V" is a number that increases by one every time the element is (re-)acquired for use, by the sender, for example. Index "ID" is a fixed value that indicates the index of the element within the array of data construct 100 and can optionally be stored within 102. Expiration time "T" is a value that indicates the time at which a transaction that the element represents will time out.

In one embodiment, the values of V and ID are included in outgoing messages with the expectation that the related incoming messages will also include these values. For example, both the outgoing query and the incoming response may include the V+ID combination. The inclusion of the version information V is useful in the scenario in which a query is sent out but subsequently times out, causing the element to be deleted from the linked list. If the element is reused, that element may again appear in the linked list, but with a different value for V. Thus, if a response to the original query is received after the element corresponding to ID has timed out and been reused, the value for V contained in the response will not match the value for V currently stored in the element at the index location pointed to by ID, and the system can correctly discard the response message. This mechanism is herein referred to as "version checking". In one embodiment, V is not incremented until the element is reused. In an alternative embodiment, V is incremented as soon as the element is processed by a timer thread (e.g., the element times out) or by a receiver thread (e.g., a response to the original query was received.)

An example of how the information shown in Table 1, above, may be used will now be described. In this example, a sender thread 202 finds (or is provided with) an unused element. Sender thread 202 may set the value of F to "0" to indicate that the element is not in use, increment the value of V by one, and include both the element ID and the updated value of V in the query message. Sender thread 202 may also include other information in the query message. In one embodiment, sender thread 202 may set F=0 and increment the value of V using a single atomic operation. In one embodiment, if the element is being used to represent a timed transaction, for example, sender thread 202 may calculate the time (or date and time) that the transaction should expire and set T to that value.

If a response to the query message does not arrive before the timeout period, a timer thread 206 may detect that the element has timed out, in which case timer thread 206 may set the value of F to "1" to indicate that the element is now in use.

If a receiver thread 204 receives a response that includes an element ID and V, receiver thread 204 may first read the values of F and V from the element identified from the element ID. If the F=1, this indicates that the query associated with this element has timed out, and receiver thread 204 may abort processing. For example, receiver thread 204 may simply discard the received response, trigger a negative acknowledgement (NACK) to be sent to the source of the response message, or take some other action.

If the value of F=0 and the value of V in the element matches the value of V in the received message, this indicates that the transaction has not timed out, in which case receiver thread 204 may set the element's F to a value of "1" and complete the processing. If the value of F=0 and the value of V does not match the value of V in the received message, on the other hand, this may indicate that the original query timed out and the freed element has since been put back into use to represent an entirely different transaction. In this case also receiver thread 204 may abort processing.

Finally, as a timer thread 206 traverses the linked list to identify and remove transactions that have expired, it may find an element having an F that is already set to 1. In this case the timer thread may either abort its operation or continue traversing the list, removing elements that have timed out, until it finds an element in the list which has not yet timed out, at which point the timer thread may terminate or return to an idle state.

Figure 5A:
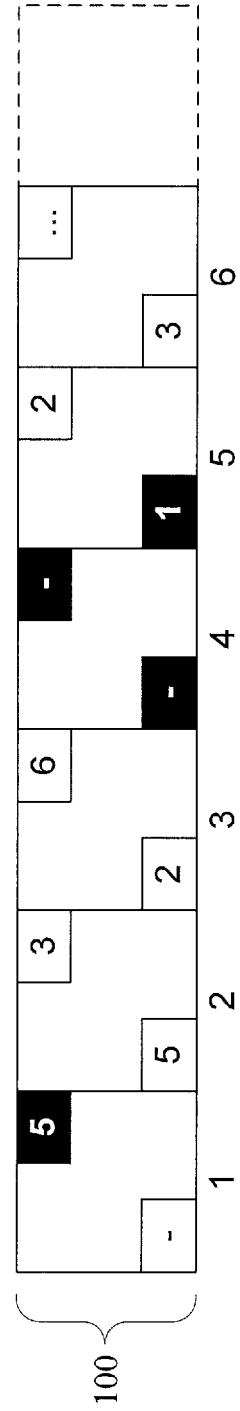
FIGS. 5A and 5B illustrate a linked-list DELETE operation using a multi-view data construct according to an embodiment of the subject matter described herein.
Figure 5B:
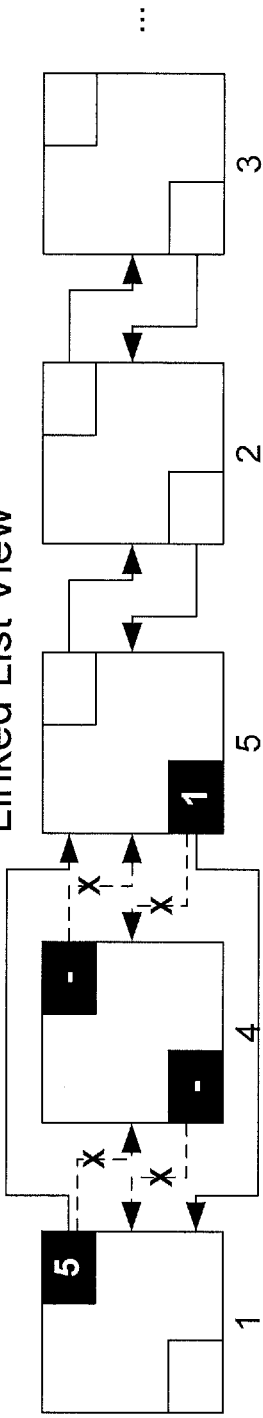

FIGS. 5A and 5B illustrate a linked-list DELETE operation using a multi-view data construct according to an embodiment of the subject matter described herein. FIG. 5A shows the operation from the array view and FIG. 5B shows the operation from the linked list view. This operation may be performed by a timer thread 206 in FIG. 2, for example, which may traverse the linked list from OLDEST to NEWEST, comparing the expiration time stored in each element to determine whether that element has expired. FIGS. 5A and 5B illustrate a change that is made to the data construct 100 as it existed in FIGS. 4A and 4B. FIGS. 4A and 4B show the contents of data construct 100 before the change and FIGS. 5A and 5B show the contents of data construct 100 after the change.

In the example illustrated in FIGS. 5A and 5B, it has been determined that the request message represented by element 4 has timed out. Element 4 is removed from the linked list by changing the N pointer of element 1 from "4" to "5" and by changing the P pointer of element 5 from "4" to "1". Element 4 is thus removed from the linked list and may be marked as available for reuse, e.g., by setting the values of its N and P pointers to a null value or other value used to indicate that the element is available for use, by adding it to a separate array, linked list, or other construct used for storing available elements, or by another mechanism.

In the example described above, a timer thread 206 traverses the linked list from left to right, removing elements whose representative request messages have expired. Thus, timer thread 206 can take advantage of the list-like quality of data construct 100. The array-like qualities of data construct 100 may be useful for other types of threads, however. For example, when a receiver thread 204 receives a response message, that response message may contain the array index that identifies the element within data construct 100 that represents the request message that the response message is associated with. This is illustrated in FIGS. 6A and 6B.

FIGS. 6A and 6B illustrate an array DELETE operation using a multi-view data construct according to an embodiment of the subject matter described herein. FIG. 6A shows the operation from the array view and FIG. 6B shows the operation from the linked list view. This operation may be performed by a receiver thread 204 in FIG. 2, for example, which may use the received array index to find the element. FIGS. 6A and 6B illustrate a change that is made to the data construct 100 as it existed in FIGS. 5A and 5B. FIGS. 5A and 5B show the contents of data construct 100 before the change and FIGS. 6A and 6B show the contents of data construct 100 after the change.

In the example illustrated in FIGS. 6A and 6B, a receiver thread 204 has received a response message that includes an array index value of "2". Receiver thread 204 can directly access element 2 of data construct 100 to retrieve from element 2 whatever information was stored there, e.g., information related to the query that generated the received response. If the information stored in element 2 matches the information contained in the response message, e.g., if the value of the version flag V currently stored in element 2 matches the value of V contained in the response, receiver thread 204 may proceed with processing. Otherwise, receiver thread 204 may abort processing. If receiver thread 204 determines that processing can continue, it can then perform a delete by reading the N and P values to determine the elements on either side of element 2. In the example illustrated in FIGS. 6A and 6B, element 2 was connected between elements 5 and 3, and so the N value of element 2 was "3" and the P value of element 2 was "5". In one embodiment, the first step is to connect element 5 to element 3 by changing their N and P values, respectively.

For example, receiver thread 204 may first change element 5's N value from "2" to "3". If, at this time, receiver thread 204 notices that element 5's N value is no longer "2", this means that another thread is performing or has performed an insert operation, and so receiver thread 204 may temporarily abort its delete operation and try again using the new pair of adjacent elements. The same principle applies if receiver thread 204 successfully updates element 5's N value but then notices that element 3's P value is no longer "2": this is an indication that another thread is performing a concurrent operation, and so receiver thread 204 may abort its current operation and restore the pointer values that it has changed so far back to their previous states, wait for some amount of time, and attempt the DELETE operation again.

In one embodiment, atomic operations may be used to update the values of P and N. For example, receiver thread 204 may use an atomic operation called "compare and swap" (CAS) to attempt to update a pointer. In one embodiment, a CAS operation compares the target to a first value, and if equal, swaps the target to a new value and returns TRUE. If the target does not equal the first value, the target is not changed and the CAS operation returns a FALSE. Thus, if two threads attempt to make the same atomic operation to the same array element, one of the operations will succeed and return TRUE while the other operation will fail and return FALSE. Thus, like in the lock-free INSERT example above, this technique obviates the need for locks during a DELETE operation as well.

Figure 7:
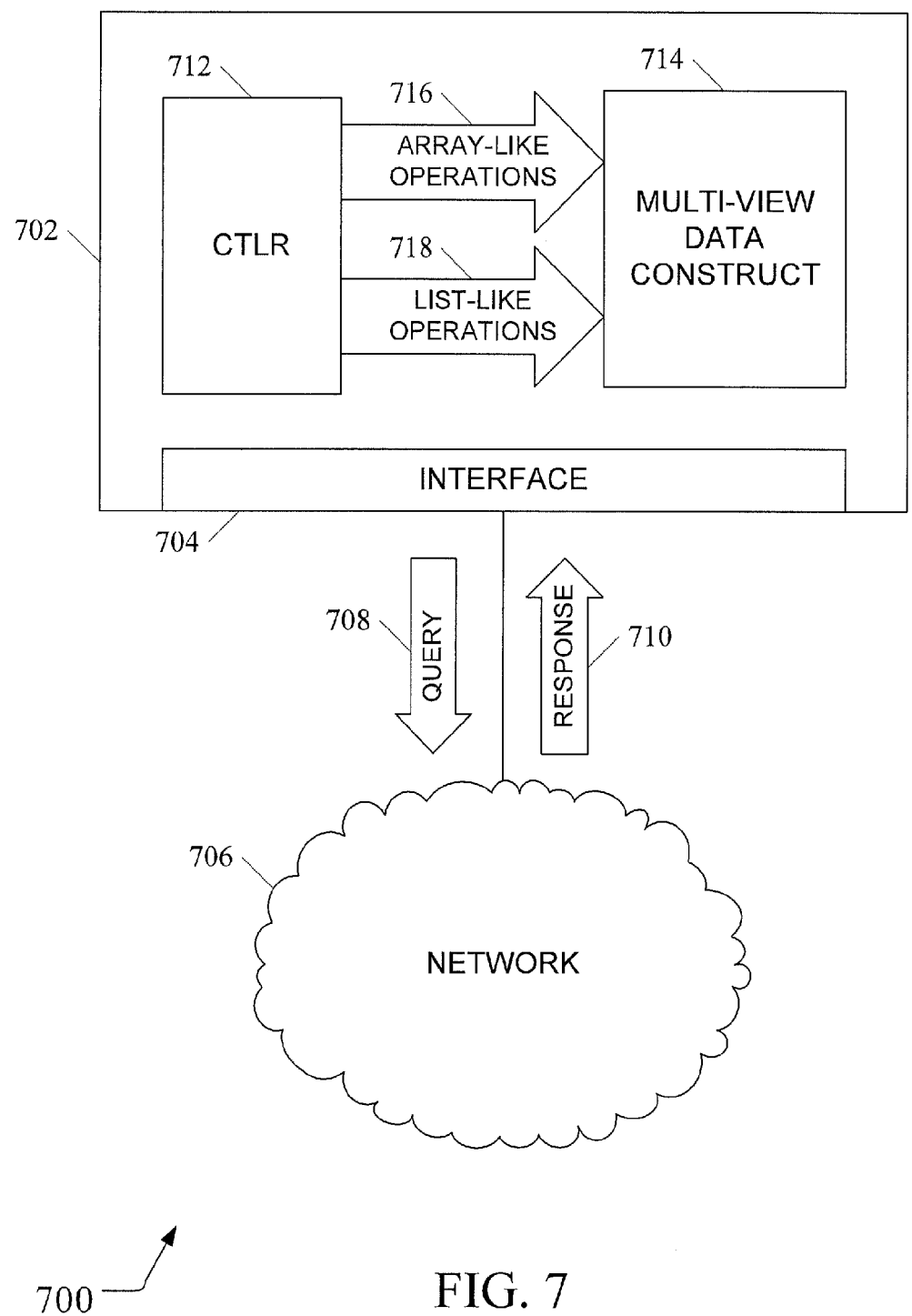
FIG. 7 is a block diagram showing an exemplary system for implementing timed transaction protocols using a multi-view data construct for lock-free operations and direct access according to an embodiment of the subject matter described herein.

FIG. 7 is a block diagram showing an exemplary system for implementing timed transaction protocols using a multi-view data construct for lock-free operations and direct access according to an embodiment of the subject matter described herein. In the embodiment illustrated in FIG. 7, system 700 includes a telecommunications node 702 that includes a network interface 704 for communicating with a telecommunications network 706. In one embodiment, node 702 may send query messages 708 and receive response messages 710. In the embodiment illustrated in FIG. 7, a controller (CTLR) 712 controls the operations of node 702, including generating messages to be sent via interface 704 and processing messages received via interface 704. CTLR 712 accesses a multi-view data construct 714, which supports both array-like operations 716 and list-like operations 718. In one embodiment, node 702 performs the operations illustrated in FIGS. 3A, 3B, 4A, 4B, 5A, 5B, 6A, and 6B.

Figure 8:
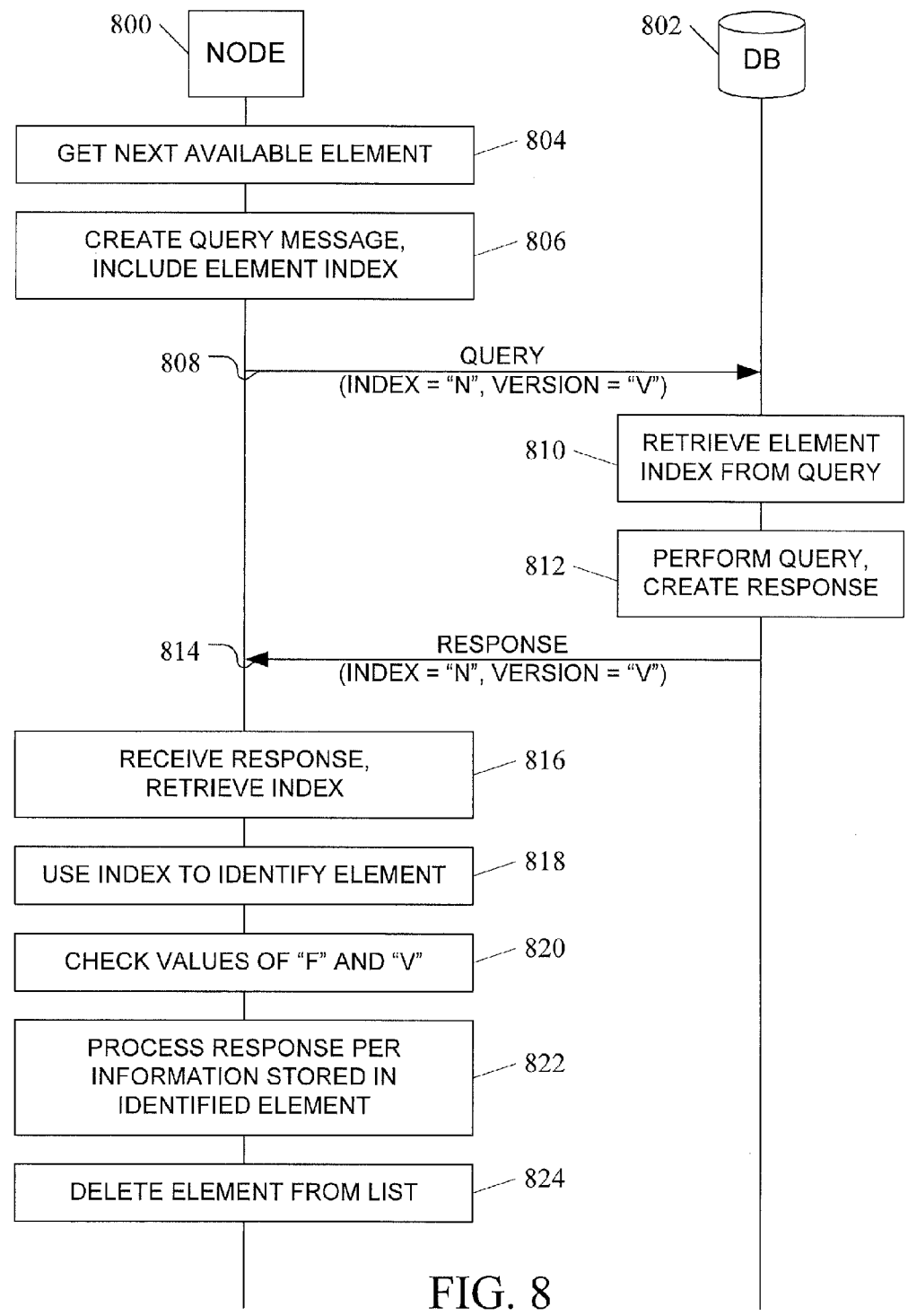
FIG. 8 is an exemplary message flow diagram illustrating signaling messages exchanged between a node that implements a multi-view data construct according to an embodiment of the subject matter described herein and another node in a telecommunications network.

FIG. 8 is an exemplary message flow diagram illustrating signaling messages exchanged between a node that implements a multi-view data construct according to an embodiment of the subject matter described herein and another node in a telecommunications network. In the embodiment illustrated in FIG. 8, node 800, which includes a multi-view data construct such as construct 100 in FIG. 1, performs a query/response transaction with a database node (DB) 802.

In the embodiment illustrated in FIG. 8, node 800 prepares for the transaction by getting the next available element from the multi-view construct (block 804.) In one embodiment, the identified element inserted into or added onto an existing linked list. For example, node 800 may perform an INSERT operation such as the one shown in FIGS. 4A and 4B.

Node 800 then generates a query message that includes information identifying the element (block 806.) This includes, but is not limited to, an element index or information from which an element index may be derived. In the embodiment illustrated in FIG. 8, the query message contains information that identifies an element (its index value "N") and the current version for the element (its version value "V".) Node 800 sends the query (message 808) to database node 802.

Database node 802 receives the query and retrieves the element index (block 810), performs the query and creates a response message (block 812), and sends the response (message 814) back to node 800.

Node 800 receives the response message and retrieves the element index from the message (block 816), uses the index to identify the element that contains information about the query that triggered the response (block 818), and confirms that the element is still not in use, e.g., by checking the F flag, and that the version numbers match, e.g., by checking the value of V (block 820). If this check passes, node 800 proceeds to process the response per the information stored in the identified element (block 822.) By using the element index, node 800 can directly find the proper element without needing to perform an iterative search or a linked list traversal. In the embodiment illustrated in FIG. 8, the transaction is complete, and so node 800 deletes the element from the list (block 824.)

Figure 9:
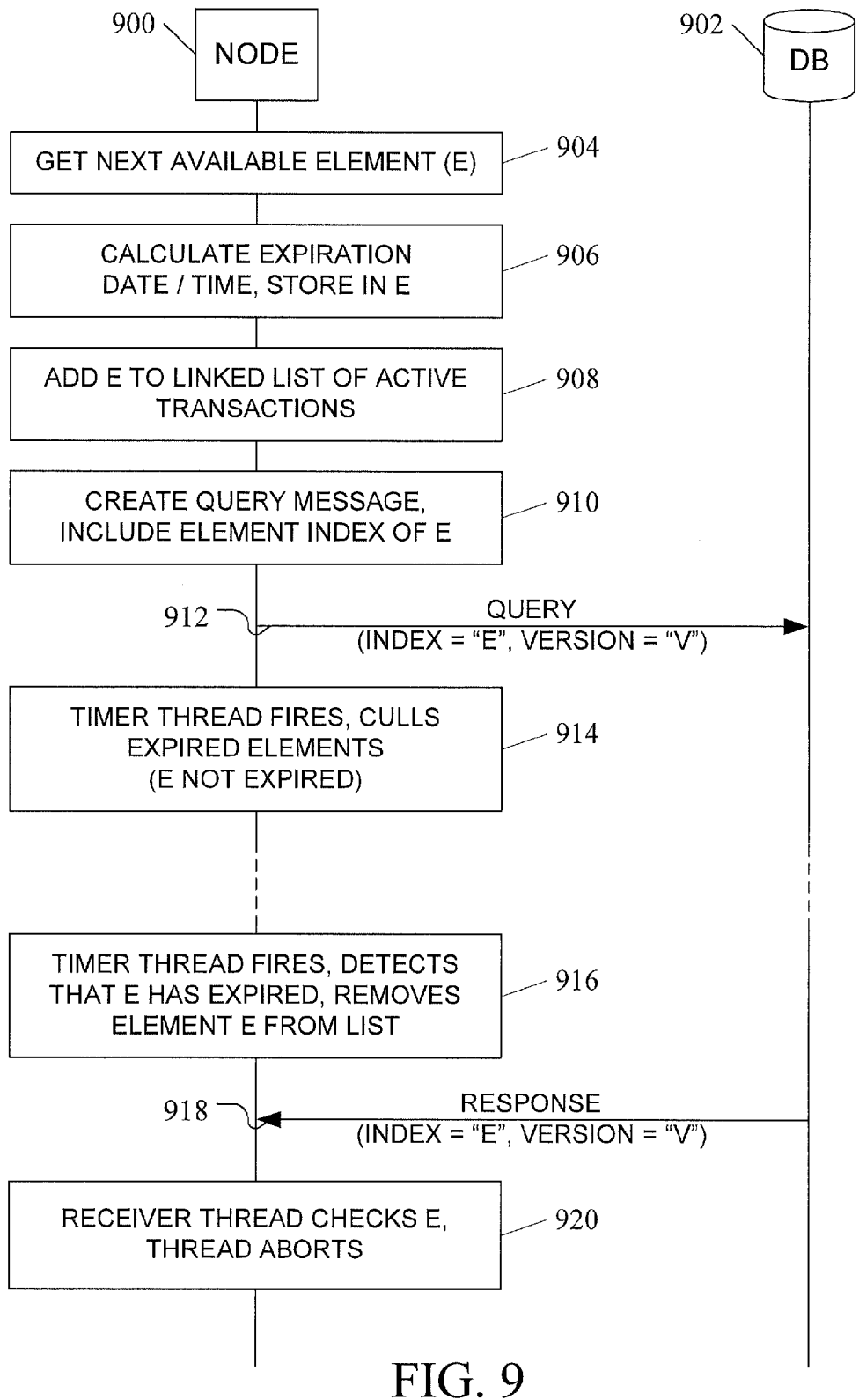
FIG. 9 is another exemplary message flow diagram illustrating signaling messages exchanged between a node that implements a multi-view data construct according to an embodiment of the subject matter described herein and another node in a telecommunications network.

FIG. 9 is an exemplary message flow diagram illustrating other signaling messages exchanged between a node that implements a multi-view data construct according to an embodiment of the subject matter described herein and another node in a telecommunications network. In the embodiment illustrated in FIG. 9, node 900, which includes a multi-view data construct such as construct 100 in FIG. 1, performs a query/response transaction with a database node (DB) 902.

In the embodiment illustrated in FIG. 9, node 900 prepares for the transaction by getting the next available element (E) from the multi-view construct (block 904.) At block 906, node 900 calculates an expiration date and time, and stores that value in element E. At block 908, element E is added to a linked list of active transactions. At block 910, node 900 generates a query message that includes the index of element E. The generated query message 912 is then sent to DB 902.

At block 914, a timer thread fires. In one embodiment, a timer thread may be activated periodically, such as every second. The timer thread traverses the linked list of active transactions and culls elements that have expired. For example, the timer thread may compare the current date and time with the value of date and time stored in each element in the linked list starting from oldest to newest; if current date and time is after the expiration date and time for an element in the linked list, that element is deleted from the linked list. In the example shown in FIG. 9, E has not yet expired and so is not removed from the list.

After some delay, a timer thread again fires (block 916.) The timer thread again traverses the linked list and discovers that the transaction associated with element E has expired, and at block 918, the timer thread removes element E from the list.

Node 900 then receives a belated response 918 to query message 912. At block 902, node 900 accesses element E, determines that the transaction has timed out, and aborts. For example, node 900 may determine from the F flag that element E is in use. Alternatively, element E may not be in use, but with a different version number than the version number included in response message 918.

Although the examples illustrated in FIGS. 8 and 9 illustrate a database transaction between two nodes, e.g., one node 800 or 900 issues a query to, and receives a response from, a separate database node 802 or 902, the multi-view data construct described herein may be used within the database node itself. For example, database node 802 may use its own multi-view data construct to manage incoming queries and correlate them with outgoing responses. In one embodiment, database node 802 may create an internal linked list to act as a queue for incoming queries; when a query response is ready to be sent, the element in the linked list that represents the query may be identified and removed from the linked list and made available to represent the next incoming query. In the example just described, incoming queries may come from nodes other than database node 802, or the queries may be generated by an application running locally on database node 802. The embodiments illustrated herein are intended to be exemplary and not limiting.

Figure 10:
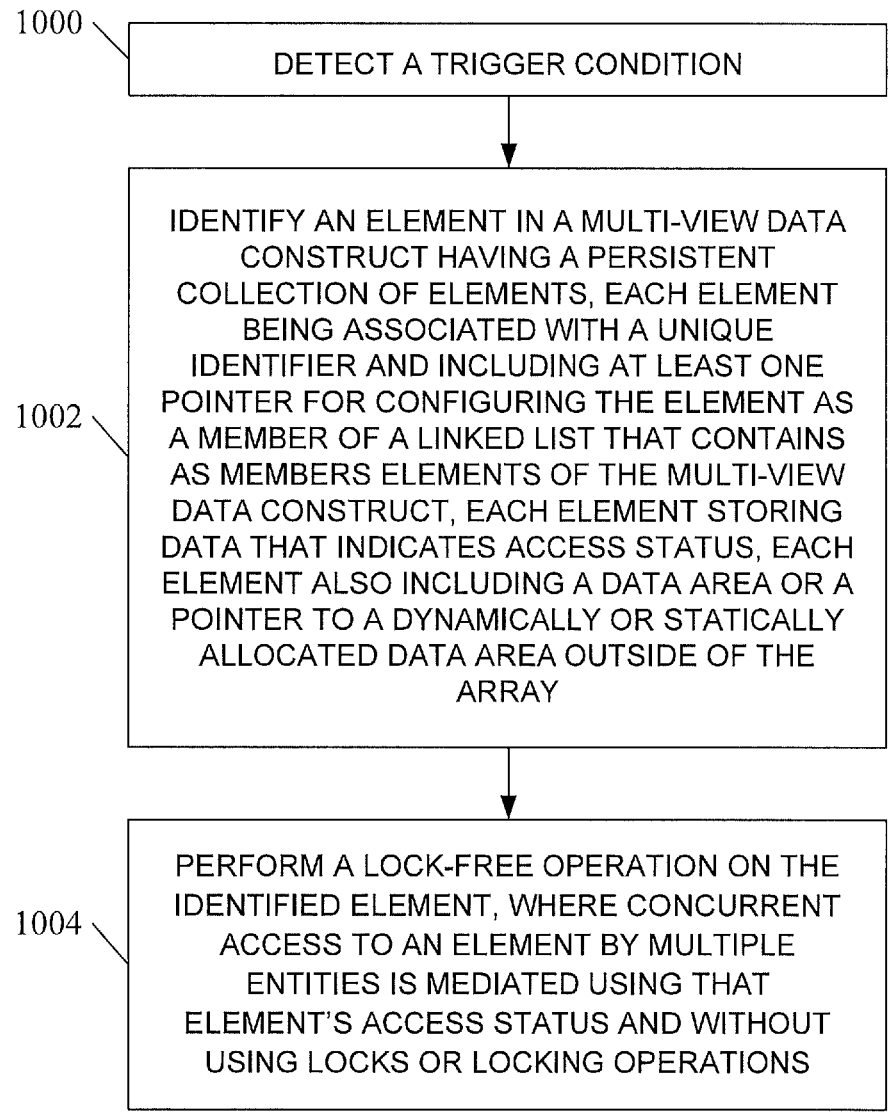
FIG. 10 is a flow chart illustrating an exemplary process using a multi-view data construct for lock-free operations and direct access according to an embodiment of the subject matter described herein.

FIG. 10 is a flow chart illustrating an exemplary process using a multi-view data construct for lock-free operations and direct access according to an embodiment of the subject matter described herein. In the embodiment illustrated in FIG. 9, the method includes, at step 1000, detecting a trigger condition. Step 1002 includes responding to the trigger condition by identifying an element in a multi-view data construct having a persistent collection of elements, each element being associated with a unique identifier and including at least one pointer for configuring the element as a member of a linked list that contains as members elements of the multi-view data construct, each element storing data that indicates access status, each element also including either a data area within the element itself or a pointer to a dynamically or statically allocated data area outside of the array. At step 1004, a lock-free operation is performed on the identified element, where concurrent access to an element by multiple entities is mediated using that element's access status, without using locks or locking operations.

Trigger conditions may be any condition that triggers a lock-free operation. Referring to system 200 in FIG. 2, for example, a sender thread 202 may request insertion of a new element into a linked list. A receiver thread 204 may access an element in the linked list by its index to get information from the element, after which the receiver thread 204 may request that the element be deleted from the linked list. A timer thread may traverse a linked list to identify and remove elements that correspond to transactions that have timed out.

The multi-view data construct described herein and the lock-free operations and direct access that it supports has wide potential application. By combining the strengths of a lock-free doubly (or singly) linked list and a lock-free circular ring buffer or pool in a single data structure with support for all linked list operations—not just queue and dequeue operations—and direct indexing, the data construct is ideal for implementing a lock-free transaction manager for timed and/or untimed transactions. Its advantages include protected processing of the same element by multiple entities, such as by timer and receiver threads, followed by deletion from the list and release to the pool. In addition, it protects answer threads from resource pool A-B-A problems using version checking. The lock-free principles described above are not limited to the insert, delete, and search/index functions described herein. For example, they can be applied to modification of an element as well.

The linked-list concept described in the examples above may be extended in a number of ways. A telecommunications node, for example, may find it useful to maintain multiple linked lists, and an element may be a member of more than one linked list. To this end, it may be useful to store within an element in the multi-view data construct other information associated with a signaling message, such as the egress port from which a query was sent or the ingress port which received a query message. In one embodiment, a telecommunications node may use the multi-view data construct to keep track of messages that are routed through (rather than generated by) the node, in which case information about both ingress and egress port may be of value and thus may be stored in the multi-view data construct. Likewise, elements that represent messages associated with a particular ingress or egress port (or some combination) may be added to a special linked list created for that purpose. Information about messages may be stored in linked lists that are organized by message type, sender ID, receiver ID, priority, transaction time limit, or other characteristic and/or classification.

In one embodiment, the multi-view construct used by a telecommunication node may comprise a master list to store all transactions, sub-lists to store transactions for each ingress port, and sub-lists to store transactions for each egress port. All transactions must be inserted in, and subsequently removed from, each list. In this embodiment, if the ingress port should become unavailable, all transactions from its corresponding sub-list may be discarded, since there will be no path available to route the responses for these transactions. Similarly, if the egress port should become unavailable, all transactions from its corresponding sub-list may be rerouted to alternate egress ports.

A telecommunications node, for example, may also find it useful to maintain multiple non-overlapping linked lists housed within the same array, such that an element may be a member of only one linked list. For example, transactions that have a time-out period of "T1" may be placed into a different linked list than transactions that have different time-out period of "T2". By only putting transactions with the same time-out period into a particular linked list, it is not necessary to consider the expiration time when inserting an element into the list: every new transaction may be inserted at the end of the list. Likewise, the timer threads can simply stop searching the list as soon as a transaction that is not yet expired is found: it is not necessary to check subsequent nodes in the linked list. Grouping transactions having the same timeout period into their own respective linked list can greatly simplify and streamline the operations that must be performed by the node. In addition, using a single underlying array allows limiting the total number of pending transactions across all timeout values.

Figure 11:
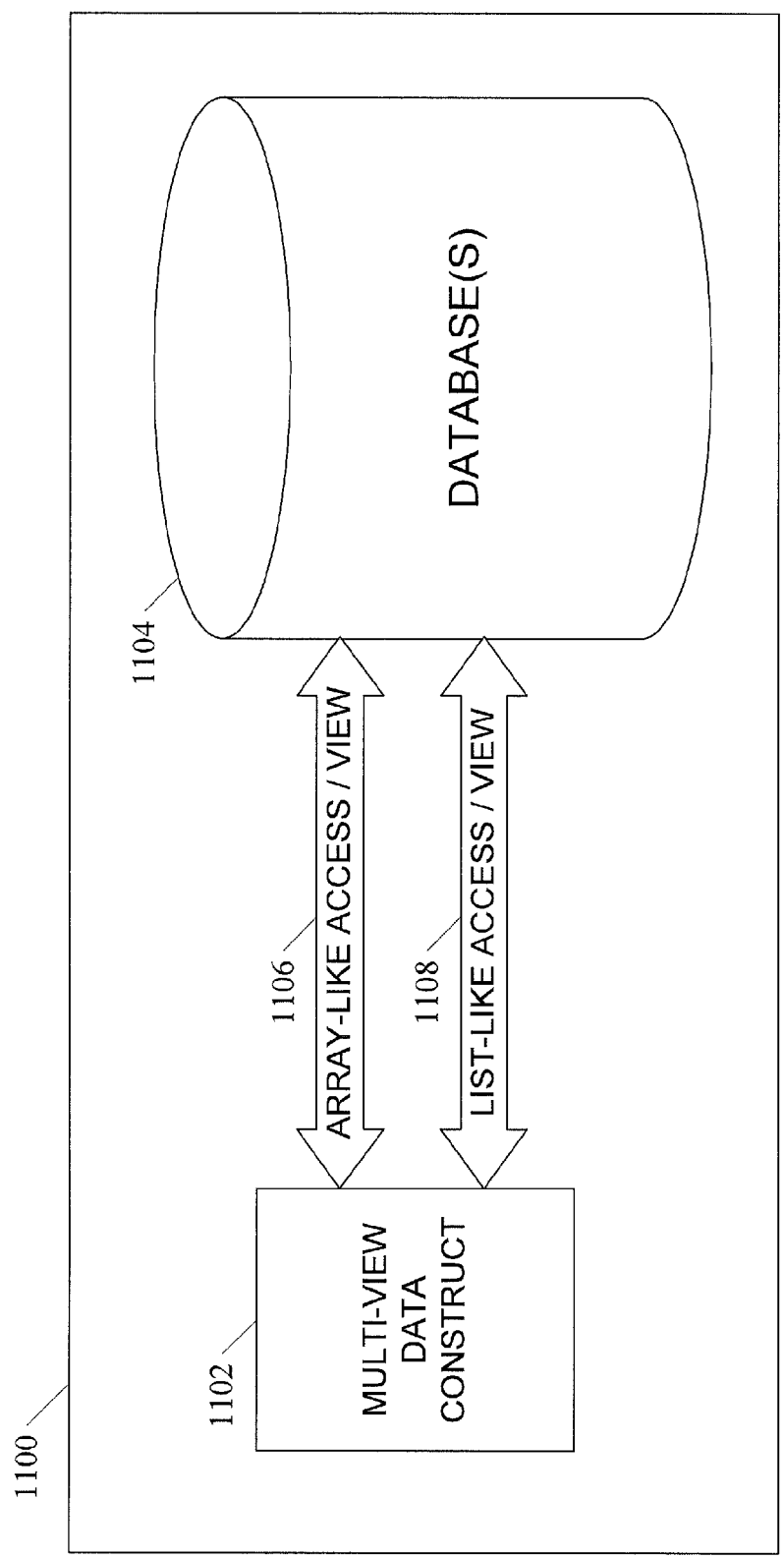
FIG. 11 is a block diagram showing an exemplary system for using a multi-view data construct for lock-free operations and direct access in a database application according to yet an embodiment of the subject matter described herein.

FIG. 11 is a block diagram showing an exemplary system for using a multi-view data construct for lock-free operations and direct access in a database application according to yet an embodiment of the subject matter described herein. In the embodiment illustrated in FIG. 11, a database system or application 1100 uses a multi-view data construct 1102 to provide multiple views into a database or set of databases 1104. In this manner, multi-view data construct 1102 provides both array-like access or data views 1106 and list-like access or data views 1108 into the same set of data within database 1104. The ability to provide lock-free operations and direct access into database 1104 can improve performance of the database application 1100 (by eliminating bottlenecks caused by locking operations).

Thus, the multi-view data construct described herein may be part of a comprehensive, multi-layered approach to maintaining data integrity. In one embodiment, for example, the multi-view data construct can embody distinct layers of protection, including: (a) a lock-free reference counted array-based pool; (b) list memory management; (c) a lock-free doubly linked list; (d) lock free coordination of producers and consumers of the data construct elements and other resources using contention resolution mechanisms, including version checking, among others. Membership of an element in one or more lists and coordination can provide yet another layer of protection. The implementation of multiple coordinating lists involves knowledge of each of the lists and the maintenance of additional information, but the benefits may outweigh the cost of the additional complexity. In these embodiments, the $2^{nd}$ layer performs, for example, reference counting; reference counting enables memory management; pointers enable list management; version and access status flags enable producer and consumer coordination.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for using a multi-view data construct for lock-free operations and direct access, the system comprising:
a multi-view data construct comprising a persistent collection of elements, each element being associated with a unique identifier, wherein each element includes at least one pointer for configuring the element as a member of a linked list that contains as members elements of the multi-view data construct, wherein each element stores data that indicates access status and the data that indicates status includes a reference count field that stores a single value that is the sum of: a) a number of elements in the multi-view construct point to the element; and b) a number of threads that are currently accessing the element, and wherein each element also includes a data area, a pointer to a dynamically allocated data area, or a pointer to a statically allocated data area, wherein the reference count for an element of a linked list will have a value of at least two, the value of at least two being calculated by adding one for each forward link and one for each backward link to the element by other elements in the linked list; and
a control module comprising hardware and for identifying elements in the collection by each element's respective identifier and for traversing elements in the collection using values in the at least one pointer contained in each element,
wherein concurrent access to an element by multiple entities is mediated using that element's access status and without using locks or locking operations.

2. The system of claim 1 wherein the data that indicates access status comprises an access status field to indicate whether or not the element is being or has been accessed, and a version field for uniquely identifying an access event.

3. The system of claim 1 wherein the life-cycle of an element is managed using data constructs stored within the element.

4. The system of claim 1 wherein the life-cycle of an element is managed using reference counting.

5. The system of claim 1 wherein the life-cycle of an element is managed using hazard pointers.

6. The system of claim 1 wherein the lock-free operations include at least one of:
a lock-free insertion of an element into the linked list;
a lock-free deletion of an element from the linked list;
a lock-free modification of an element in the linked list; and
a lock-free relocation of an element within the linked list.

7. The system of claim 1 wherein the multi-view data construct provides multiple views of a set of data within a database.

8. The system of claim 1 wherein the control module is configured to implement a transaction protocol and wherein each element of the multi-view data construct corresponds to a transaction.

9. The system of claim 8 wherein the transaction protocol comprises a query/response protocol, wherein each query is associated with an element in the multi-view data construct.

10. The system of claim 9 wherein each query contains information identifying the element that is associated with the query and wherein the information identifying the element contained by the query will be included in a response to the query.

11. The system of claim 10 wherein the control module is configured to process a response by identifying a query that is associated with the response by examination of elements within the multi-view data construct.

12. The system of claim 1 wherein the control module is configured to implement a telecommunications protocol and wherein each element of the multi-view data construct is associated with a signaling message.

13. The system of claim 8 wherein the control module is configured to identify and process elements that correspond to transactions that have completed or have been cancelled.

14. The system of claim 8 wherein the transaction protocol comprises a timed transaction protocol.

15. The system of claim 14 wherein the control module is configured to include in the element that represents the signaling message information indicating when the transaction initiated by the signaling message will expire.

16. The system of claim 15 wherein the control module is configured to identify and process elements that represent transactions that have expired.

17. The system of claim 16 wherein the control module is configured to identify elements that represent transactions that have expired by traversing a linked list that contains as members elements of the multi-view data construct.

18. A method for using a multi-view data construct for lock-free operations and direct access, the method comprising:

at a node comprising hardware, detecting a trigger condition, and, in response to detecting the trigger condition:
identifying an element in a multi-view data construct comprising a persistent collection of elements, each element being associated with a unique identifier and including at least one pointer for configuring the element as a member of a linked list that contains as members elements of the multi-view data construct, wherein each element stores data that indicates access status and the data that indicates status includes a reference count field that stores a single value that is the sum of: a) a number of elements in the multi-view construct point to the element; and b) a number of threads that are currently accessing the element, and wherein each element also includes a data area, a pointer to a dynamically allocated data area, or a pointer to a statically allocated data area, wherein the reference count for an element of a linked list will have a value of at least two, the value of at least two being calculated by adding one for each forward link and one for each backward link to the element by other elements in the linked list; and
performing a lock-free operation on the identified element, wherein concurrent access to an element by multiple entities is mediated using that element's access status and without using locks or locking operations.

19. The method of claim 18 wherein each of a plurality of independent processes has simultaneous access to the multi-view data construct.

20. A non-transitory computer readable medium having stored thereon executable instructions that when executed by the processor of a computer control the computer to perform steps comprising:
detecting a trigger condition; and
in response to detecting the trigger condition, identifying an element in a multi-view data construct comprising a persistent collection of elements, each element being associated with a unique identifier and including at least one pointer for configuring the element as a member of a linked list that contains as members elements of the multi-view data construct, wherein each element stores data that indicates access status and the data that indicates status includes a reference count field that stores a single value that is the sum of: a) a number of elements in the multi-view construct point to the element; and b) a number of threads that are currently accessing the element, and wherein each element also includes a data area, a pointer to a dynamically allocated data area, or a pointer to a statically allocated data area, wherein the reference count for an element of a linked list will have a value of at least two, the value of at least two being calculated by adding one for each forward link and one for each backward link to the element by other elements in the linked list; and
performing a lock-free operation on the identified element, wherein concurrent access to an element by multiple entities is mediated using that element's access status and without using locks or locking operations.

* * * * *